(12) United States Patent
Galli

(10) Patent No.: US 7,295,296 B1
(45) Date of Patent: Nov. 13, 2007

(54) PORTABLE TARGET LOCATOR APPARATUS AND METHOD OF USE

(75) Inventor: Thomas J. Galli, Rockwall, TX (US)

(73) Assignee: L-3 Communications Integrated Systems L.P., Greenville, TX (US)

( * ) Notice: Subject to any disclaimer, the term of this patent is extended or adjusted under 35 U.S.C. 154(b) by 55 days.

(21) Appl. No.: 11/304,930

(22) Filed: Dec. 15, 2005

(51) Int. Cl.
*G01B 11/26* (2006.01)

(52) U.S. Cl. .............................. 356/139.01; 356/139.1

(58) Field of Classification Search ............ 356/139.01
See application file for complete search history.

(56) References Cited

U.S. PATENT DOCUMENTS

| | | |
|---|---|---|
| 4,949,089 A | 8/1990 | Ruszkowski, Jr. |
| 4,949,098 A * | 8/1990 | Gluck et al. ................. 347/197 |
| 5,801,866 A | 9/1998 | Chan et al. |
| 5,825,480 A | 10/1998 | Udagawa |

* cited by examiner

*Primary Examiner*—Thomas H. Tarcza
*Assistant Examiner*—Luke D. Ratcliffe
(74) *Attorney, Agent, or Firm*—Hovey Williams, LLP

(57) ABSTRACT

A portable target locator for use by a ground observer to accurately determine the location of a target and transmit location information and firing instructions to an unmanned vehicle so the unmanned vehicle can locate the target and perform an operation based on the firing instructions. The apparatus comprises optics for permitting a user to see a magnified view of the target; a location determining component for determining a location of the apparatus; rangefinder for determining a range from the apparatus to the target; an Azimuth sensor for determining an Azimuth from the apparatus to the target; a processor for determining the location of the target based on the location of the apparatus, the range to the target, and the Azimuth from the apparatus to the targets, a transmitter for transmitting the location information and the firing instructions to the unmanned vehicle, and a portable handheld housing.

17 Claims, 3 Drawing Sheets

PORTABLE TARGET LOCATOR APPARATUS AND METHOD OF USE

FIELD OF THE INVENTION

The present invention relates to target location devices and methods. More particularly, the invention relates to a portable target locator apparatus for determining a location of a target and for sending location information and other information to an unmanned vehicle so the vehicle can locate the target and perform operations in accordance with the transmitted information.

BACKGROUND

The U.S. military increasingly relies on Close Air Support (CAS) to protect troops on the ground, especially when the troops are in close proximity to enemy forces or civilians. Manned aircrafts are commonly used for CAS operations because pilots or other operators of the aircrafts can accurately determine the locations of desired targets through visual observation and can make ultimate firing decisions. Target location acquisition is often aided by one or more ground observers or "men in the loop" who locate desired targets and communicate target location information and firing suggestions to the operators of the CAS vehicles. Such ground observers also help limit fratricide.

Unfortunately, CAS operations are very dangerous for manned aircrafts due to enemy anti-aircraft weaponry. Armed, unmanned aircrafts are not currently used for CAS operations because the lack of pilots to observe targets and receive instructions and feedback from ground observers makes accurate target identification and location more difficult.

Portable target locator devices for use by ground observers have been developed to alleviate some of the above-described problems. However, most if not all of these devices are designed for use with manned aircraft and therefore require a pilot or other operator to make ultimate targeting and firing decisions.

Accordingly, there is a need for an improved portable target locator apparatus and method that overcomes the limitations of the prior art.

SUMMARY OF THE INVENTION

The present invention solves the above-described problems and provides a distinct advance in the art of target location devices and methods. More particularly, the present invention provides a portable target locator apparatus for use by a ground observer to provide information to an unmanned aircraft or other vehicle. The apparatus accurately determines the location of a target and transmits both target location information and firing instructions to the unmanned vehicle so the unmanned vehicle can locate the target and apply weaponry to the target based on the firing instructions. The present invention may also be used to locate non-military targets or objects such as fires, biohazards, chemical hazards, persons in need of rescue, and supply drop zones. In fact, the present invention has utility in any situation in which the mission or surrounding environment is too dangerous, tedious, and/or costly for a manned aircraft.

One embodiment of the present invention comprises: optics for permitting a user to see a magnified view of a target or other object; a location determining component for determining a current location of the apparatus; a rangefinder for determining a range from the apparatus to the target; an Azimuth sensor for determining an Azimuth from the apparatus to the target; a processor coupled with the location determining component, the rangefinder and the Azimuth sensor for determining the location of the target; an input device operable by the user to input firing instructions, vehicle instructions or other instructions; and a transmitter for transmitting the location information and the firing instructions, vehicle instructions, or other instructions to the unmanned vehicle so the unmanned vehicle can locate the target and apply weaponry to the target or perform other operations based on the firing instructions or other instructions.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein.

Figure 1:
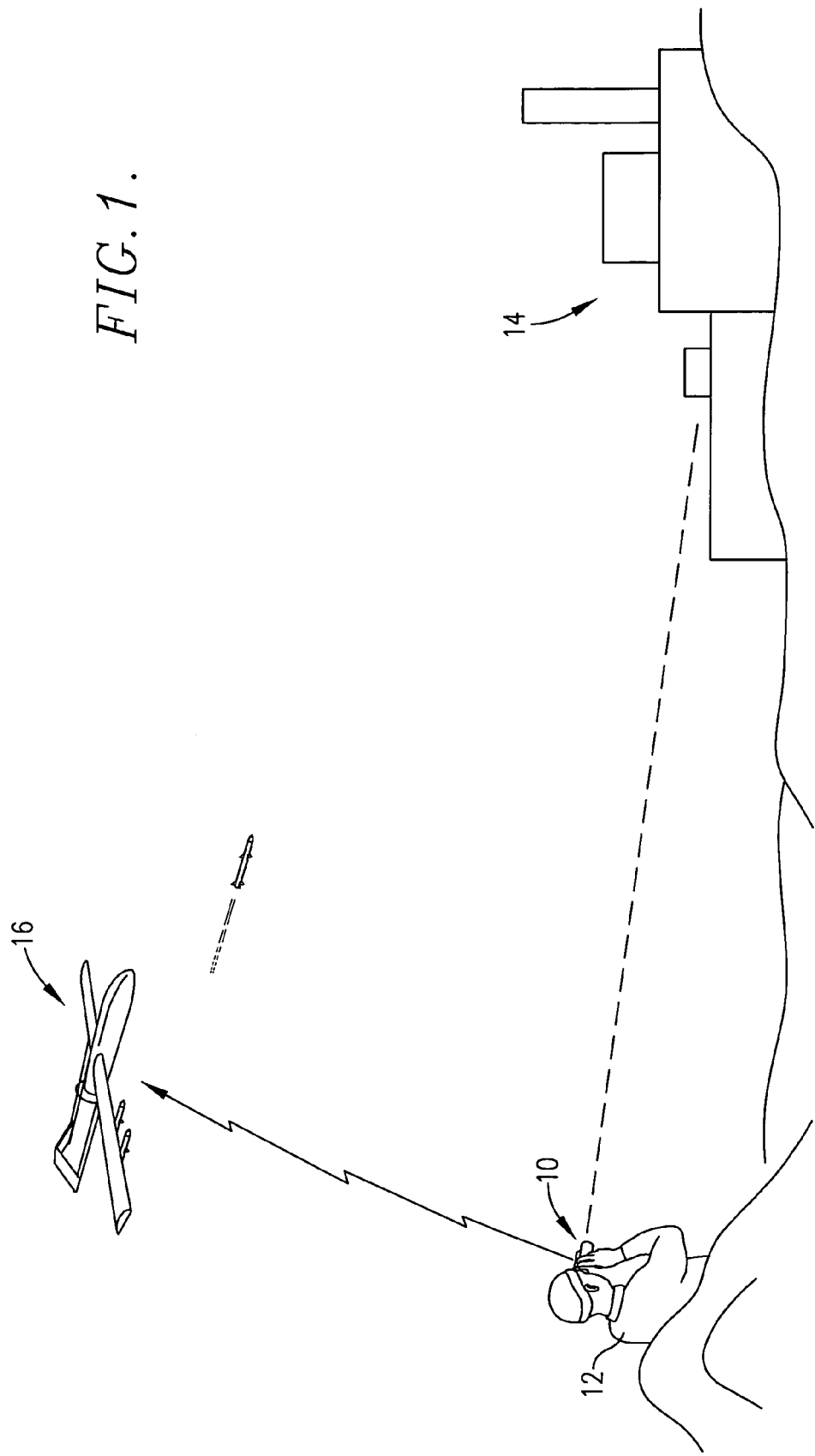
FIG. 1 is a pictorial representation showing a user operating the portable locator apparatus of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Turning now to the drawing figures, a portable locator apparatus 10 constructed in accordance with a preferred embodiment of the invention is illustrated. As shown in FIG. 1, the apparatus 10 may be used by a ground observer 12 to determine a location of a target 14 and to send location information and instructions to an unmanned vehicle 16 so that the vehicle can locate the target 14 and apply weaponry or perform other operations in accordance with the instructions. The apparatus 10 is not limited to military uses and can be used in any situation in which a manned vehicle is not needed or desired. For example, the apparatus 10 can be used to accurately determine the location of a fire, a biohazard, a chemical hazard, a person in need of rescue, a supply drop zone, or any other object and to communicate the location of the object along with other instructions to an unmanned vehicle so that the vehicle may perform one or more desired operations such as releasing a fire suppressant or biological or chemical remediation agent, rescuing a victim, etc.

Figure 3:
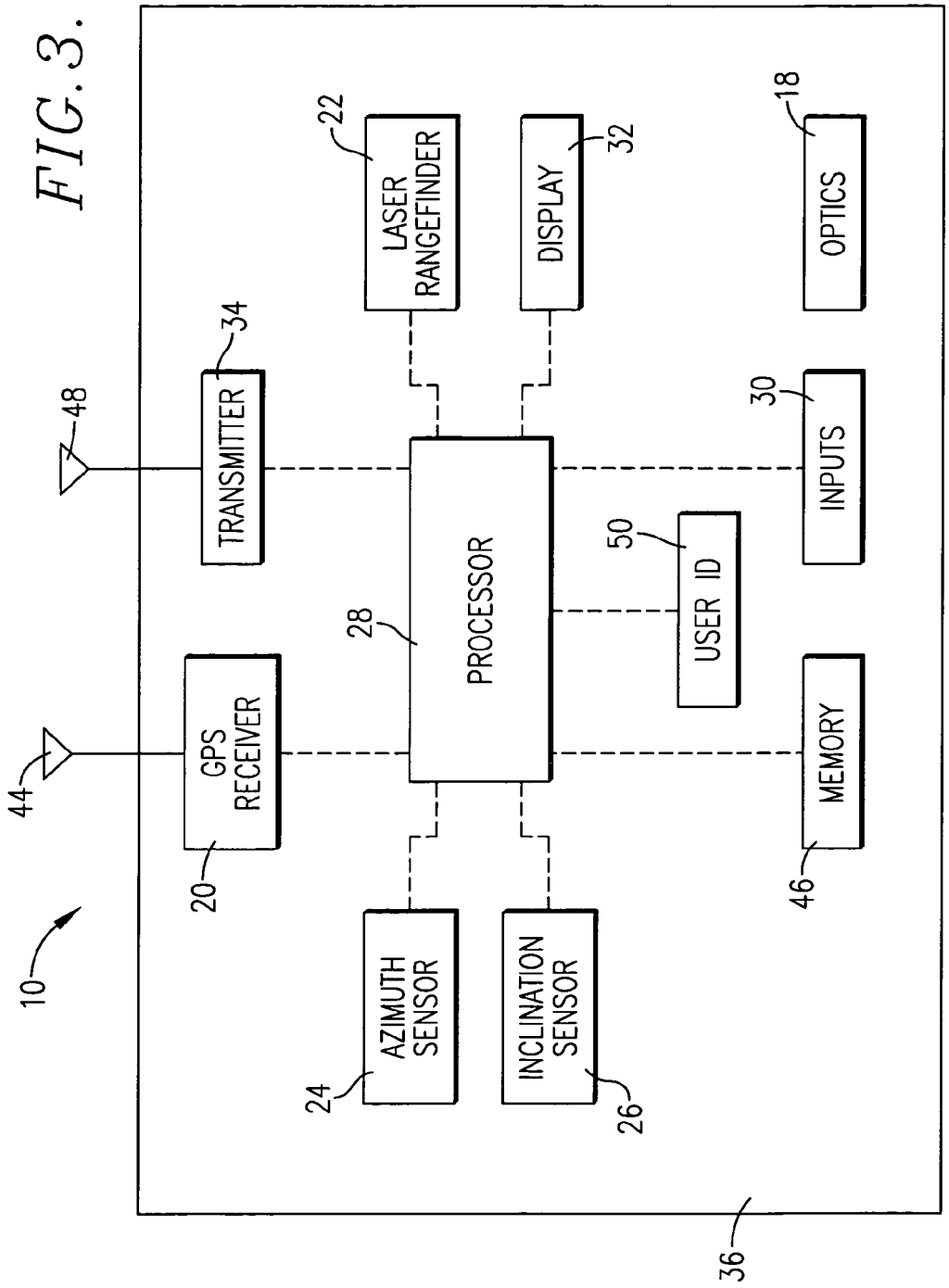
FIG. 3 is a block diagram illustrating some of the components of the portable locator apparatus.

The present invention can be implemented in hardware, software, firmware, or a combination thereof. In preferred embodiments illustrated in FIGS. 1 and 3, the invention is shown implemented with a portable target locator apparatus 10 broadly comprising optics 18, a location determining component 20, a rangefinder 22, an Azimuth sensor 24, an inclination sensor 26, a processor 28, input devices 30, an optional display 32, and a transmitter 34, all housed within a portable, lightweight, handheld housing 36.

The optics 18 are preferably part of a pair of binoculars and include both a daytime monocular for permitting viewing of objects in relatively high light situations and an infrared (IR) night vision monocular for permitting viewing of objects in relatively low light situations. In this way, a user can look through either the daytime monocular or night vision monocular with one eye depending on the ambient light conditions. Alternatively, the optics 18 may include a pair of conventional monoculars or a pair of night vision monoculars so the apparatus is designed primarily for either daytime or nighttime use, respectively.

The location determining component 20 is preferably a GPS receiver designed for use with the GPS system. The GPS system is a satellite-based radio navigation system capable of determining continuous position, velocity, time, and direction information for an unlimited number of users. Formally known as NAVSTAR, the GPS incorporates a plurality of satellites which orbit the earth in extremely precise orbits. Based on these precise orbits, GPS satellites can relay their location to any number of receiving units.

The GPS system is implemented when a device specially equipped to receive GPS data begins scanning radio frequencies for GPS satellite signals. Upon receiving a radio signal from a GPS satellite, the device can determine the precise location of that satellite via one of different conventional methods. The device will continue scanning for signals until it has acquired at least three different satellite signals. Implementing geometrical triangulation, the receiver utilizes the three known positions to determine its own two-dimensional position relative to the satellites. Acquiring a fourth satellite signal will allow the receiving device to calculate its three-dimensional position by the same geometrical calculation. The positioning and velocity data can be updated in real time on a continuous basis by an unlimited number of users.

Although GPS enabled devices are often used to describe navigational devices, it will be appreciated that satellites need not be used to determine a geographic position of a receiving unit since any receiving device capable of receiving the location from at least three transmitting locations can perform basic triangulation calculations to determine the relative position of the receiving device with respect to the transmitting locations. For example, cellular towers or any customized transmitting radio frequency towers can be used instead of satellites. With such a configuration, any standard geometric triangulation algorithm can be used to determine the exact location of the receiving unit. In this way, personal hand held devices, cell phones, intelligent appliances, intelligent apparel, and others can be readily located geographically, if appropriately equipped to be a receiving unit.

Figure 2:
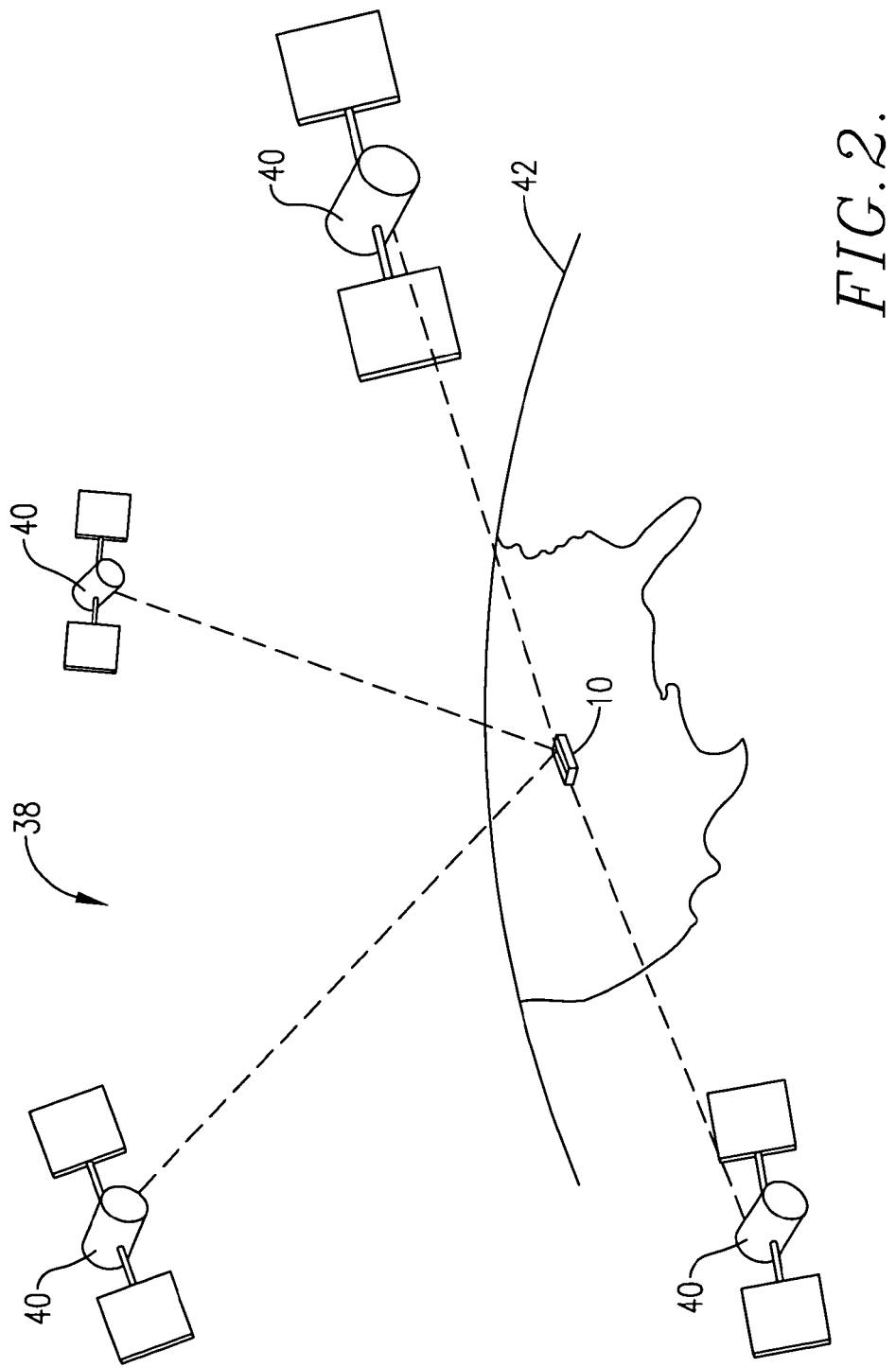
FIG. 2 is a schematic diagram of a Global Positioning System (GPS) that may be used to implement certain aspects of the present invention.

FIG. 2 shows one representative view of a GPS denoted generally by reference numeral 38. A plurality of satellites 40 are in orbit about the Earth 42. The orbit of each satellite is not necessarily synchronous with the orbits of other satellites and, in fact, is likely asynchronous. A GPS receiver device such as the portable target locator apparatus 10 of the present invention is shown receiving spread spectrum GPS satellite signals from the satellites 40.

The spread spectrum signals continuously transmitted from each satellite 40 utilize a highly accurate frequency standard accomplished with an extremely accurate atomic clock. Each satellite 40, as part of its data signal transmission, transmits a data stream indicative of that particular satellite. The locator apparatus 10 must acquire spread spectrum GPS satellite signals from at least three satellites to calculate its two-dimensional position by triangulation. Acquisition of an additional signal, resulting in signals from a total of four satellites, permits the locator apparatus 10 to calculate its three-dimensional position.

The location determining component 20 may include one or more processors, controllers, or other computing devices and memory for storing information accessed and/or generated by the processors or other computing devices. In addition to receiving navigational signals from the GPS satellites 40 and calculating a position of the locator apparatus 10 as a function of the signals, the location determining component 20 may also be operable to calculate a route to the target 14 or other location, provide instructions to navigate to the desired location, display maps and other information on the display screen, and to execute other functions described herein. The memory may store cartographic data and routing used by or generated by the location determining component's computing devices. The memory may be integral with the location determining component 20, stand-alone memory, or a combination of both. The memory may include, for example, removable TransFlash cards.

The location determining component 20 also includes an antenna 44, which is preferably positioned within or on the housing 36, to assist the location determining component in receiving signals. The antenna is preferably a GPS patch antenna or helical antenna but may be any other type of antenna that can be used with navigational devices. The antenna may be mounted directly on or in the housing or may be mounted external to the housing. The antenna is preferably protected from adverse conditions, such as those described above, by being entirely enclosed within the housing 36.

The rangefinder 22 is coupled with the processor 28, and is preferably an integrated laser rangefinder. The rangefinder includes a transmitter for transmitting a short burst of laser energy toward the target 14 in a pulsed beam. The inputs 30 preferably include laser fire button or other manually activated trigger located on the housing 36 for triggering the transmission of the burst of energy. The rangefinder 22 also includes a sensor which detects the scatter of the transmitted laser energy when it impacts the target and a clock or timer for measuring the elapsed time between the initial transmission of the laser energy and the detection of the scatter. The elapsed time is then used to calculate the range of the target from the apparatus.

The Azimuth sensor 24 is coupled with the processor 28 and is preferably an electronic compass or other device operable for detecting the Earth's magnetic field to determine the Azimuth between the apparatus 10 and the target 14 or other object viewed with the optics.

The inclination sensor 26 is also coupled with the processor 28 and can be any device capable of detecting the angle of depression or elevation of the apparatus 10 when used to view the target 14. The inclination sensor 26 may use a single sensing device or a cluster of sensing devices depending on the desired degree of accuracy.

The processor 28 can be any computing device such as a microprocessor, microcontroller, application specific integrated circuit, etc. and is operable for receiving information from the GPS receiver 20, the rangefinder 22, the Azimuth sensor 24, and the inclination sensor 26 and for determining the geographic coordinates or other location information of the viewed target 14. The processor 28 may be coupled with external memory 46 or may be equipped with internal memory for temporarily storing the location information and other information such as the firing instructions or the vehicle instructions described below.

In accordance with one important aspect of the present invention, the inputs 30 may include a selector switch, button or other device for permitting a user to input firing instructions for transmission to the unmanned vehicle 16. For example, a selector switch may permit a user to select firing instructions including strafing instructions, missile delivery instructions, photograph acquisition instructions, and/or reconnaissance instructions. The input device or devices may also be used to input vehicle instructions such as routing instructions, rescue instructions, fire suppressant release instructions, biohazard remediation instructions, and chemical hazard remediation instructions.

The transmitter 34 is coupled with the processor 28 and is preferably a radio frequency transmitter or transceiver including an associated RF antenna 48. The transmitter 34 is operable to transmit the location information, firing instructions, and/or vehicle instructions described above to the unmanned vehicle 16. The inputs 30 may include a transmitter initiation button which can be pressed or otherwise operated to trigger the transmission of information to the unmanned vehicle.

The display screen 32 is coupled with the processor 28 for displaying information such as an image of the target, the location of the apparatus, the location of the target, the range from the apparatus to the target, the Azimuth from the apparatus to the target, the inclination of the apparatus, the firing instructions, or the vehicle instructions. The display screen 32 is preferably an LCD display capable of displaying both text and graphical information. The display may also be backlit such that it may be viewed in the dark or other low-light environments.

The apparatus 10 may also include a user identification device 50 for identifying a user to ensure that only authorized persons are able to operate the apparatus 10. The user identification device 50 may include, for example, a retinal scanner, a fingerprint scanner, and/or a password program which permits operation only after the entry of an authorized password.

The locator apparatus 10 also includes batteries and/or a solar cell for powering the processor and the other electrical components of the apparatus. Alternatively, the apparatus may include an electrical plug for connecting to an external source of power such as a conventional electrical outlet or external battery.

The portable handheld housing 36 is preferably formed of lightweight, impact-resistant, waterproof plastic and is configured so that it can easily be held by a user to view a target or other object. In one embodiment, the handheld housing is shaped similarly to a conventional pair of binoculars.

In operation, a ground observer uses the locator apparatus 10 to view a target 14 or other object as depicted in FIG. 1. Once the desired target or object is located, the user may press the laser fire button to trigger the laser rangefinder22. At the same time, the GPS receiver 20 determines the current location of the apparatus, the Azimuth sensor 24 determines the Azimuth of the apparatus, and the inclination sensor 26 determines the inclination of the apparatus. The processor 28 then calculates the geographic coordinates or other location information of the target 14 based on the range, the current location information, the Azimuth, and the inclination values.

Once the target location information is calculated, the user can operate the transmitter trigger button to initiate transmission of the location information to the unmanned vehicle 16. If the user wishes to provide firing instructions, vehicle instructions, or other instructions to the unmanned vehicle, the user can enter these instructions before pressing the transmitter trigger button.

The transmitted location information, firing instructions, and/or vehicle instructions are then received by a receiver or transceiver positioned on the unmanned vehicle 16. Receipt of this information by the unmanned vehicle 16 triggers a software routine in the vehicle which causes the vehicle to fly a particular CAS profile, apply munitions on the target at the appropriate release point, or perform other functions in accordance with the firing instructions, vehicle instructions or other instructions. After the unmanned vehicle 16 has completed an air strike or other operation, a ground observer may again use the locator apparatus 10 to view the effects of the air strike or other operation on the target 14 and to request additional air strikes or operations by the unmanned vehicle 16 if necessary.

Although the invention has been described with reference to the preferred embodiment illustrated in the attached drawing figures, it is noted that equivalents may be employed and substitutions made herein without departing from the scope of the invention as recited in the claims. For example, although the unmanned vehicle 16 is described and illustrated herein as being an unmanned aircraft, it may also be an unmanned tank, truck, robot, car, or any other autonomous or semi-autonomous vehicle or device.

Having thus described the preferred embodiment of the invention, what is claimed as new and desired to be protected by Letters Patent includes the following:

1. A portable target locator apparatus for determining a location of a target and for sending location information to an unmanned vehicle, the apparatus comprising:
   optics for permitting a user to see a magnified view of the target;
   a location determining component for determining a location of the apparatus;
   a rangefinder for determining a range from the apparatus to the target;
   an Azimuth sensor for determining an Azimuth from the apparatus to the target;
   a processor coupled with the location determining component, the rangefinder and the Azimuth sensor for determining the location information for the target based on the location of the apparatus, the range to the target, and the Azimuth from the apparatus to the target;
   an input device operable by the user to input firing instructions; and
   a transmitter for transmitting the location information and the firing instructions to the unmanned vehicle so the unmanned vehicle can locate the target and perform an operation on the target based on the firing instructions.

2. The apparatus as set forth in claim 1, wherein the optics include a daytime monocular and a night vision monocular.

3. The apparatus as set forth in claim 1, wherein the location determining component is a GPS receiver.

4. The apparatus as set forth in claim 1, wherein the rangefinder is a laser rangefinder which includes a transmitter for transmitting a short burst of laser energy and a sensor for detecting the effect of the laser energy as it strikes the target.

5. The apparatus as set forth in claim 1, further including an inclination sensor for measuring a horizontal inclination of the apparatus, wherein the processor is coupled with the inclination sensor for determining the location of the target partially based on the inclination of the apparatus.

6. The apparatus as set forth in claim 1, wherein the firing instructions are selected from the group consisting of strafing instructions, missile delivery instructions, photograph acquisition instructions, and reconnaissance instructions.

7. The apparatus as set forth in claim 1, wherein the transmitter is a radio frequency transmitter.

8. The apparatus as set forth in claim 1, further including an input device for permitting the user to selectively control when the transmitter transmits the location information and the firing instructions to the unmanned vehicle.

9. The apparatus as set forth in claim 1, further including an input device for permitting the user to selectively control when the rangefinder is operated.

10. The apparatus as set forth in claim 1, further including a display coupled with the processor for displaying information selected from the group consisting of an image of the target, the location of the apparatus, the location of the target, the range from the apparatus to the target, the Azimuth from the apparatus to the target, the inclination of the apparatus, and the firing instructions.

11. The apparatus as set forth in claim 1, further including a power source selected from the group consisting of batteries, a solar cell, and an electrical connector for powering the location determining component, the rangefinder, the Azimuth sensor, the processor, and the transmitter.

12. The apparatus as set forth in claim 1, further including memory coupled with the processor for storing the location information and the firing instructions.

13. The apparatus as set forth in claim 1, further including a user identification device selected from the group consisting of a retinal scanner, a fingerprint scanner, and a password program for permitting only authorized users to operate the apparatus.

14. A portable locator apparatus for determining a location of an object and for sending location information to a nearby vehicle, the apparatus comprising:
   optics for permitting a user to see a magnified view of the object;
   a location determining component for determining a location of the apparatus;
   a rangefinder for determining a range from the apparatus to the object;
   an Azimuth sensor for determining an Azimuth from the apparatus to the object;
   a processor coupled with the location determining component, the rangefinder and the Azimuth sensor for determining the location information based on the location of the apparatus, the range to the object, and the Azimuth from the apparatus to the object;
   an input device operable by the user to input vehicle instructions; and
   a transmitter for transmitting the location information and the vehicle instructions to the nearby vehicle so the nearby vehicle can locate the object and operate in accordance with the vehicle instructions.

15. The apparatus as set forth in claim 14, wherein the object is selected from the group consisting of a military target, a fire, a biohazard, a chemical hazard, a person in need of rescue, and a supply drop zone.

16. The apparatus as set forth in claim 14, wherein the vehicle instructions are selected from the group consisting of routing instructions, rescue instructions, fire suppressant release instructions, biohazard remediation instructions, and chemical remediation instructions.

17. A method of controlling an unmanned vehicle with a portable handheld locator apparatus, the method comprising the steps of:
   determining a current location of the apparatus;
   determining a range from the apparatus to the target;
   determining an Azimuth between the apparatus and the target;
   calculating location information for the target based on the current location of the apparatus, the range to the target, and the Azimuth between the apparatus and the target;
   receiving vehicle instructions in the locator apparatus; and
   transmitting the location information and vehicle instructions from the locator apparatus to the unmanned vehicle so that the unmanned vehicle can locate the target and perform an operation in accordance with the vehicle instructions.

* * * * *